(12) United States Patent
Suciu et al.

(10) Patent No.: US 7,541,314 B2
(45) Date of Patent: Jun. 2, 2009

(54) MICROARRAY HAVING A BASE CLEAVABLE SULFONYL LINKER

(75) Inventors: Dominic Suciu, Edmonds, WA (US); Hetian Gao, Fremont, CA (US)

(73) Assignee: CombiMatrix Corporation, Mukilteo, WA (US)

( * ) Notice: Subject to any disclaimer, the term of this patent is extended or adjusted under 35 U.S.C. 154(b) by 260 days.

(21) Appl. No.: 11/361,160

(22) Filed: Feb. 24, 2006

(65) Prior Publication Data

US 2007/0202509 A1    Aug. 30, 2007

(51) Int. Cl.
*C40B 40/00*    (2006.01)
*C40B 40/06*    (2006.01)
*C40B 40/12*    (2006.01)
*C40B 50/00*    (2006.01)
*C12Q 1/68*    (2006.01)
*C07H 21/00*    (2006.01)

(52) U.S. Cl. ............... 506/13; 506/16; 506/19; 506/23; 435/6; 536/23.1; 536/24.3; 536/25.3

(58) Field of Classification Search ........... 536/25.3, 536/23.1, 24.3; 435/6; 506/13, 16, 19, 23
See application file for complete search history.

*Primary Examiner*—Jezia Riley
(74) *Attorney, Agent, or Firm*—Michael D. Vrbanac

(57) ABSTRACT

The present invention provides a microarray having base cleavable, sulfonyl-containing linkers and a process to make the microarray. Oligonucleotides of any sequence may be synthesized on the microarray having the cleavable linker. The oligonucleotides may be cleaved and recovered as a pool of oligonucleotides having a three prime phosphate moiety. Specifically, the microarray is an electrode containing microarray, and the oligonucleotides are electrochemically synthesized.

36 Claims, 3 Drawing Sheets

A sulfonyl amidite

MICROARRAY HAVING A BASE CLEAVABLE SULFONYL LINKER

TECHNICAL FIELD OF THE INVENTION

This invention provides microarrays having a plurality of base cleavable sulfonyl linkers attached at known locations. The present invention further provides a process to make the microarrays having a plurality of base cleavable sulfonyl linkers attached at known locations. Further, the present invention provides oligonucleotides synthesized in situ onto the base cleavable sulfonyl linkers and subsequently cleaved from the microarray to provide a pool of oligonucleotides sequences each characterized by having a three prime phosphate moiety.

BACKGROUND OF THE INVENTION

Microarray preparation methods for synthetic oligomers, including oligonucleotides (oligos) include the following: (1) spotting a solution on a prepared flat or substantially planar surface using spotting robots; (2) in situ synthesis by printing reagents via ink jet or other computer printing technology and using standard phosphoramidite chemistry; (3) in situ parallel synthesis using electrochemically generated acid for removal of protecting groups and using standard phosphoramidite chemistry; (4) in situ synthesis using maskless photo-generated acid for removal of protecting groups and using regular phosphoramidite chemistry; (5) mask-directed in situ parallel synthesis using photo-cleavage of photolabile protecting groups (PLPG) and standard phosphoramidite chemistry; (6) maskless in situ parallel synthesis using PLPG and digital photolithography and standard phosphoramidite chemistry; and (7) electric field attraction/repulsion for depositing fully formed oligos onto known locations.

Photolithographic techniques for in situ oligo synthesis are disclosed in Fodor et al. U.S. Pat. No. 5,445,934 and the additional patents claiming priority thereto, all of which are incorporated by reference herein. Electric field attraction/repulsion microarrays are disclosed in Hollis et al. U.S. Pat. No. 5,653,939 and Heller et al. U.S. Pat. No. 5,929,208, both of which are incorporated by reference herein. An electrode microarray for in situ oligo synthesis using electrochemical deblocking is disclosed in Montgomery U.S. Pat. Nos. 6,093,302; 6,280,595, and 6,444,111 (Montgomery I, II, and III respectively), all of which are incorporated by reference herein. Another and materially different electrode array (not a microarray) for in situ oligo synthesis on surfaces separate and apart from electrodes using electrochemical deblocking is disclosed in Southern U.S. Pat. No. 5,667,667, which is incorporated by reference herein. A review of oligo microarray synthesis is provided by: Gao et al., *Biopolymers* 2004, 73:579.

U.S. patent application Ser. No. 10/243,367, filed 12 Sep. 2002 (Oleinikov) discloses a process for assembling a polynucleotide from a plurality of oligonucleotides. The claimed process provides a plurality of oligonucleotide sequences that are synthesized in situ or spotted on a microarray device. The oligonucleotide sequences are cleaved at a cleavable linker site to form a soluble mixture of oligonucleotides. The cleavable linker is a chemical composition having a succinate moiety bound to a nucleotide moiety such that cleavage produces a 3'-hydroxy nucleotide.

Formation of an ester linkage to an organic hydroxyl on a solid surface using a succinate is relatively difficult and often results in relatively low yield. Additionally, the reaction conditions require a relatively long period of time at relatively high temperature. Finally, oligonucleotides cleaved from the microarray disclosed in Oleinikov have a three prime hydroxyl, which may limit the use of such oligonucleotides or result in the need for an additional step to modify the three-prime hydroxyl. Increasing yield would increase oligonucleotide density and provide more efficient production of oligonucleotides on a microarray. Additionally, providing oligonucleotides having three-prime functionality that is different from a three prime hydroxyl expands the use of such oligonucleotides. The present invention addresses the issues in Oleinikov of low yield and hence low oligonucleotide density at a location on a microarray by providing alternative cleavable linker chemistry, which is more reactive to hydroxyl groups on a microarray. Additionally, the present invention addresses the limitations of oligonucleotides having a three-prime hydroxyl by providing different three-prime chemistry.

BRIEF SUMMARY OF THE INVENTION

The present invention provides a process for forming a microarray having base cleavable sulfonyl linkers comprising:

(a) providing an array having known locations having a plurality of hydroxyl groups, wherein the array comprises a surface or a matrix proximate to the surface, wherein the density of the known locations is greater than approximately 100 per square centimeter; and (b) bonding one or a plurality of sulfonyl amidite containing reagents to the hydroxyl groups at the known locations to form a plurality of cleavable linkers bonded to the known locations, wherein the cleavable linkers comprise a hydroxyl moiety and a base-labile cleaving moiety, whereby a phosphorous-oxygen bond is formed between phosphorous of the sulfonyl amidite containing reagent and oxygen of the hydroxyl groups.

The present invention further provides a process forming a microarray having base cleavable sulfonyl linkers comprising:

(a) providing an array device having a plurality of known locations, each having a plurality of hydroxyl groups, wherein the density of the known locations is greater than approximately 100 per square centimeter;

(b) bonding a plurality of sulfonyl amidite moieties to the hydroxyl groups to form a plurality of cleavable linkers attached to the array device at each known location, wherein the cleavable linkers comprise a linker hydroxyl moiety and a base-labile cleaving moiety, whereby a phosphorous-oxygen bond is formed between phosphorous of the sulfonyl amidite moieties and oxygen of the hydroxyl groups; and (c) synthesizing a plurality of oligomers onto the linker hydroxyl moieties.

Preferably, the oligomers are selected from the group consisting of DNA, RNA, and polypeptide, and combinations thereof. Preferably, the oligomers are synthesized in situ using electrochemical synthesis. Optionally, the oligomers are synthesized in situ by a method selected from the group consisting of (i) printing reagents via ink jet or other printing technology and using regular phosphoramidite chemistry, (ii) maskless photo-generated acid controlled synthesis and using regular phosphoramidite chemistry, (iii) mask-directed parallel synthesis using photo-cleavage of photolabile protecting groups, and (iv) maskless parallel synthesis using photo-cleavage of photolabile protecting groups and digital photolithography.

The present invention further provides a process forming a microarray having base cleavable sulfonyl linkers comprising:

(a) providing an array device having a plurality of known locations, each having a plurality of hydroxyl groups, wherein the density of the plurality of known locations is greater than approximately 100 per square centimeter;

(b) bonding a plurality of sulfonyl amidite moieties to the hydroxyl groups to form a plurality of cleavable linkers bonded to the known locations, wherein the cleavable linkers comprise a linker hydroxyl moiety and a base-labile cleaving moiety, whereby a phosphorous-oxygen bond is formed between phosphorous of the sulfonyl amidite moieties and oxygen of the hydroxyl groups;

(c) synthesizing a plurality of oligomers covalently bound to the linker hydroxyl moiety; and (d) cleaving the oligomers from the known locations at the base-labile cleaving moiety using a cleaving base, whereby the oligomers are recoverable, whereby the oligomers comprising DNA and RNA have a 3' phosphate after cleaving from the solid surface.

Preferably, the cleaving base is selected from the group consisting of ammonium hydroxide, electrochemically generated base, sodium hydroxide, potassium hydroxide, methylamine, and ethylamine and combinations thereof.

In another embodiment, the present invention provides a pool of oligomers produced by (a) providing an array having known locations having a plurality of hydroxyl groups, wherein the array comprises a surface or a matrix proximate to the surface, wherein the density of the known locations is greater than approximately 100 per square centimeter; and (b) bonding a plurality of sulfonyl amidite moieties to the hydroxyl groups to form a plurality of cleavable linkers bonded to the known locations, wherein the cleavable linkers comprise a linker hydroxyl moiety and a base-labile cleaving moiety, whereby a phosphorous-oxygen bond is formed between phosphorous of the sulfonyl amidite moieties and oxygen of the hydroxyl groups; (c) synthesizing a plurality of oligomers covalently bound to the linker hydroxyl moiety; and (d) cleaving the oligomers from the known locations at the base-labile cleaving moiety using a cleaving base, whereby the oligomers comprising DNA and RNA have a 3' phosphate after cleaving from the solid surface, wherein the oligomers are oligonucleotides having a 3' phosphate, wherein the pool comprises more than approximately 100 different oligonucleotides.

Preferably, the array comprises electrodes and each of the known locations comprise one of the electrodes, wherein the electrodes are electronically addressable. Preferably, the known locations are on the same surface as the electrodes, on an opposing surface to the electrodes, or on an overlayer over the electrodes.

Optionally, the array is glass having a silane linking agent having organic hydroxyl groups, wherein the organic hydroxyl groups are the hydroxyl groups of the known locations. Preferably, the silane linking agent is a chemical selected from the group consisting of hydroxymethyltriethoxysilane, N-(3-triethoxysilylpropyl)gluconamide, N-(3-triethoxysilylpropyl)-4-hydroxybutyramide, 1-trimethoxysilyl-3-propanol, 1-trimethoxysilyl-2,3-propanediol, 1-triethoxysilyl-3-propanol, 1-triethoxysilyl-2,3-propanediol, 1-trimethoxysilyl-2-ethanol, triethoxysilyl-2-ethanol, trimethoxysilyl-11-undecanol, and triethoxysilyl-11-undecanol and combinations thereof.

Preferably, the sulfonyl amidite moiety is 2-[2-(4,4'-dimethoxytrityloxy)ethylsulfonyl) ethyl-(2-cyanoethyl)-(N, N-diisopropyl)-phosphoramidite.

Preferably, spacers having reactive hydroxyl groups are bound to the hydroxyl moieties, wherein the sulfonyl amidite moieties are bound to the reactive hydroxyl groups of the spacers. Preferably, the spacer is selected from the group consisting of DNA, RNA, polyethylene glycol, and polypeptides, and combinations thereof. Preferably, the spacer is approximately 1 to 35 mers.

Preferably, a porous reaction layer attached to the known locations provides the hydroxyl groups, wherein the porous reaction layer comprises a chemical species or mixture of chemical specie, wherein the chemical species is selected from the group consisting of monosaccharides, disaccharides, trisaccharides, polyethylene glycol, polyethylene glycol derivative, N-hydroxysuccinimide, formula I, formula II, formula III, formula IV, formula V, formula VI, formula VII, and combinations thereof, wherein formula I is

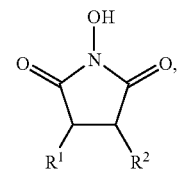

formula II is

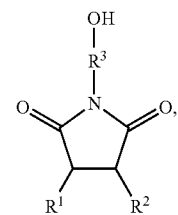

formula III is $HOR^4(OR^5)_m R^9$, formula IV is

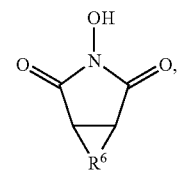

formula V is

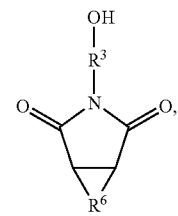

formula VI is

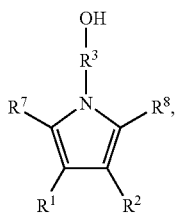

and formula VII is

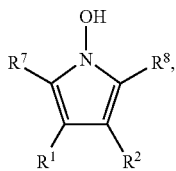

wherein in each formula m is an integer from 1 to 4; $R^1$, $R^2$, $R^7$, and $R^8$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester; $R^3$ is selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group; $R^4$ and $R^5$ are independently selected from the group consisting of methylene, ethylene, propylene, butylene, pentylene, and hexylene; $R^6$ forming a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group; and $R^9$ is selected from the group consisting of amino and hydroxyl.

Preferably, the monosaccharide is selected from the group consisting of allose, altrose, arabinose, deoxyribose, erythrose, fructose, galactose, glucose, gulose, idose, lyxose, mannose, psicose, L-rhamnose, ribose, ribulose, sedoheptulose, D-sorbitol, sorbose, sylulose, tagatose, talose, threose, xylulose, and xylose. Preferably, the disaccharide is selected from the group consisting of amylose, cellobiose, lactose, maltose, melibiose, palatinose, sucrose, and trehalose Preferably, the triaccharide is selected from the group consisting of raffinose and melezitose.

Preferably, the polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra(ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa(ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra(ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether. Preferably, the polyethylene glycol has a molecular weight of approximately 1,000 to 20,000.

Further, the present invention provides a microarray having base cleavable sulfonyl linkers comprising:

(a) an array device having a plurality of known locations each having a plurality of reacted hydroxyl groups, wherein the density of the plurality of known locations is greater than approximately 100 per square centimeter; and (b) a plurality of reacted sulfonyl amidite moieties bonded to the plurality of reacted hydroxyl groups to form a plurality of cleavable linkers attached to the plurality of known locations, wherein the cleavable linkers have a linker hydroxyl group and a base-labile cleaving site, whereby a phosphorous-oxygen bond is between phosphorous of the reacted sulfonyl amidite moieties and oxygen of the reacted hydroxyl groups.

Further, the present invention provides a microarray device having base cleavable sulfonyl linkers comprising:

(a) a microarray device having a plurality of known locations each having a plurality of reacted hydroxyl groups, wherein the density of the plurality of known locations is greater than approximately 100 per square centimeter;

(b) a plurality of reacted sulfonyl amidite moieties bonded to the plurality of reacted hydroxyl groups to form a plurality of cleavable linkers attached to the plurality of known locations, wherein the cleavable linkers have a linker hydroxyl group and a base-labile cleaving site, whereby a phosphorous-oxygen bond is between phosphorous of the reacted sulfonyl amidite moieties and oxygen of the reacted hydroxyl groups; and (c) oligomers bonded to the linker hydroxyl groups.

Preferably, the oligomers are selected from the group consisting of DNA, RNA, and polypeptide, and combinations thereof. Preferably, the oligomers are synthesized in situ using electrochemical synthesis. Optionally, the oligomers are synthesized in situ by a method selected from the group consisting of (i) printing reagents via ink jet or other printing technology and using regular phosphoramidite chemistry, (ii) maskless photo-generated acid controlled synthesis and using regular phosphoramidite chemistry, (iii) mask-directed parallel synthesis using photo-cleavage of photolabile protecting groups, and (iv) maskless parallel synthesis using photo-cleavage of photolabile protecting groups and digital photolithography.

Preferably, the microarray device comprises an electrode array having an electrode at each known location, wherein the electrodes are electronically addressable. Preferably, the known locations are located on a same surface as the electrodes, on an opposing surface to the electrodes, or on an overlayer over the electrodes.

Preferably, the solid surface is glass having a silane linking agent having organic hydroxyl groups, wherein the organic hydroxyl groups are the hydroxyl groups at the plurality of known locations. Preferably, the silane linking agent is chemical selected from the group consisting of hydroxymethyltriethoxysilane, N-(3-triethoxysilylpropyl)gluconamide, N-(3-triethoxysilylpropyl)-4-hydroxybutyramide, 1-trimethoxysilyl-3-propanol, 1-trimethoxysilyl-2,3-propanediol, 1-triethoxysilyl-3-propanol, 1-triethoxysilyl-2,3-propanediol, 1-trimethoxysilyl-2-ethanol,triethoxysilyl-2-ethanol, trimethoxysilyl-11-undecanol, and triethoxysilyl-11-undecanol and combinations thereof.

Preferably, the reacted sulfonyl amidite moiety is 2-[2-(4,4'-dimethoxytrityloxy)ethyl sulfonyl)ethyl-(2-cyanoethyl)-(N,N-diisopropyl)-phosphoramidite.

Preferably, spacers having reactive hydroxyl groups are bound to the reacted hydroxyl groups of the known locations, wherein the sulfonyl amidite moieties are bound to the reactive hydroxyl groups of the spacers. Preferably, the spacers are selected from the group consisting of DNA, RNA, polyethylene glycol, and polypeptides, and combinations thereof. Preferably, the spacers are from approximately 1 to 35 mers.

Preferably, a porous reaction layer attached to the known locations provides the reacted hydroxyl groups, wherein the porous reaction layer comprises a chemical species or mixture of chemical specie, wherein the chemical species is selected from the group consisting of monosaccharides, disaccharides, trisaccharides, polyethylene glycol, polyethylene glycol derivative, N-hydroxysuccinimide, formula I, formula II, formula III, formula IV, formula V, formula VI, formula VII, and combinations thereof, wherein formula I is

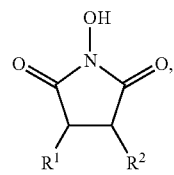

formula II is

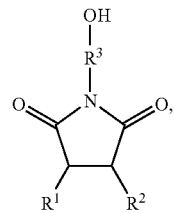

formula III is $HOR^4(OR^5)_m R^9$, formula IV is

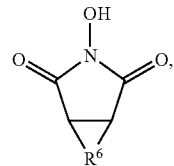

formula V is

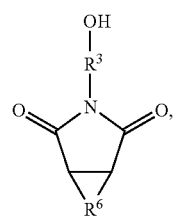

formula VI is

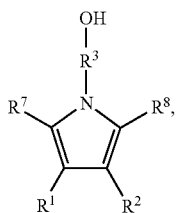

and formula VII is

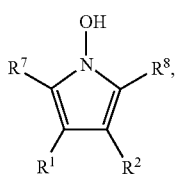

wherein in each formula m is an integer from 1 to 4; $R^1$, $R^2$, $R^7$, and $R^8$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester; $R^3$ is selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group; $R^4$ and $R^5$ are independently selected from the group consisting of methylene, ethylene, propylene, butylene, pentylene, and hexylene; $R^6$ forming a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group; and $R^9$ is selected from the group consisting of amino and hydroxyl.

Preferably, the monosaccharide is selected from the group consisting of allose, altrose, arabinose, deoxyribose, erythrose, fructose, galactose, glucose, gulose, idose, lyxose, mannose, psicose, L-rhamnose, ribose, ribulose, sedoheptulose, D-sorbitol, sorbose, sylulose, tagatose, talose, threose, xylulose, and xylose. Preferably, the disaccharide is selected from the group consisting of amylose, cellobiose, lactose, maltose, melibiose, palatinose, sucrose, and trehalose. Preferably, the triaccharide is selected from the group consisting of raffinose and melezitose.

Preferably, the polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra(ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa(ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra(ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'- tetra(ethylene glycol) undecenyl ether. Preferably, the polyethylene glycol has a molecular weight of approximately 1,000 to 20,000.

DETAILED DESCRIPTION OF THE INVENTION

Definitions

Figure 1A:
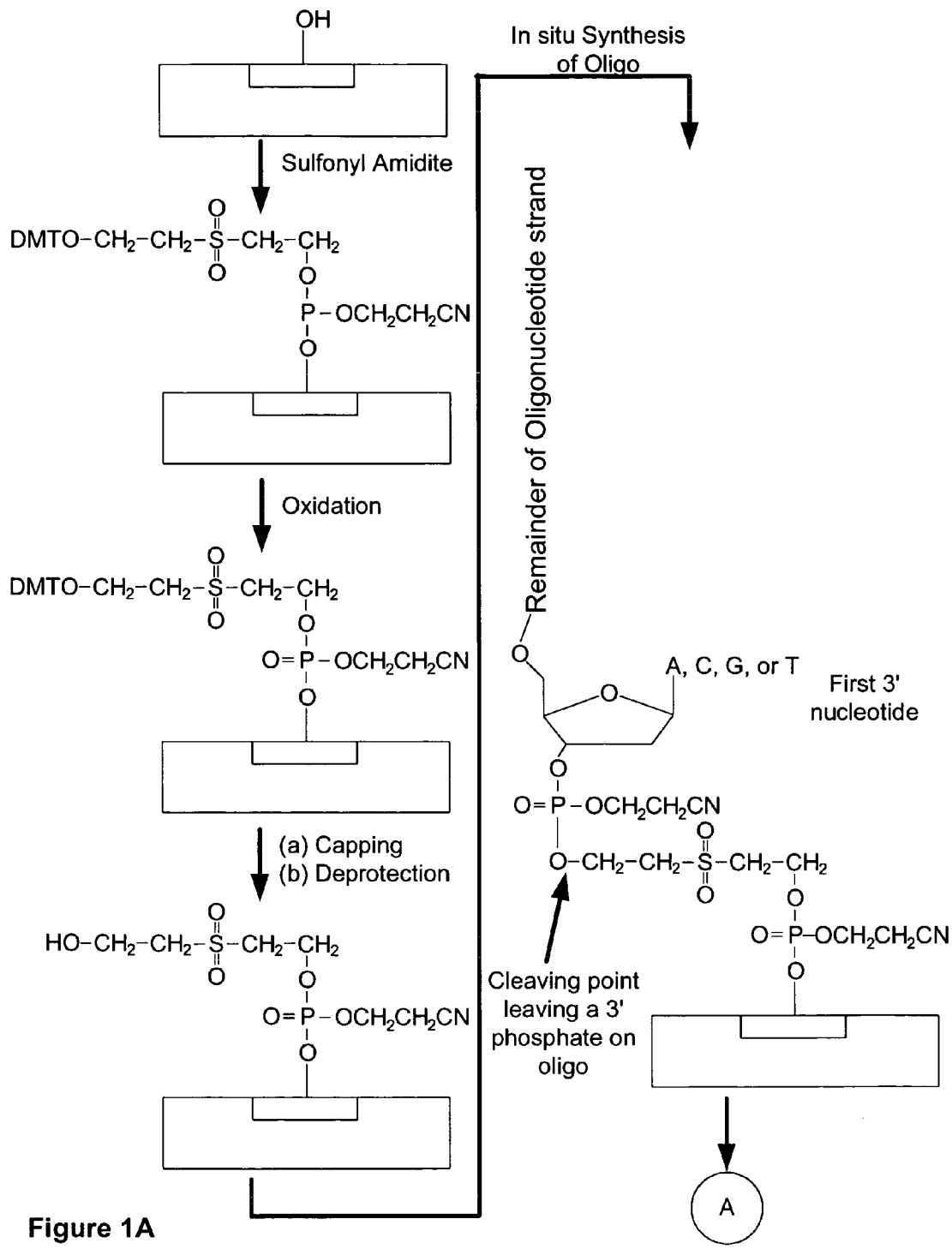
FIGS. 1A and 1B are a schematic of a cross section of an inventive microarray device showing one known location undergoing a sequence of steps for the bonding of a cleavable linker, an oligonucleotide to the linker, and then removal of the oligonucleotide by cleaving the linker using a base.

Generally, nomenclature for chemical groups as used herein follows the recommendations of "The International Union for Pure and Applied Chemistry", Principles of Chemical Nomenclature: a Guide to IUPAC Recommendations, Leigh, G. J.; Favre, H. A. and Metanomski, W. V., Blackwell Science, 1998, the disclosure of which is incorporated by reference herein. Formation of substituted structures is limited by atom valence requirements.

"Oligomer" means a molecule of intermediate relative molecular mass, the structure of which essentially comprises a small plurality of units derived, actually or conceptually, from molecules of lower relative molecular mass. A molecule is regarded as having an intermediate relative molecular mass if it has properties which do vary significantly with the removal of one or a few of the units. If a part or the whole of the molecule has an intermediate relative molecular mass and essentially comprises a small plurality of units derived, actually or conceptually, from molecules of lower relative molecular mass, it may be described as oligomeric, or by oligomer used adjectivally. Oligomers are typically comprised of a monomer.

The term "co-oligomer" means an oligomer derived from more than one species of monomer. The term oligomer includes co-oligomers. A single stranded DNA molecule consisting of any combination of deoxyadenylate (A), deoxyguanylate (G), deoxycytidylate (C), and deoxythymidylate (T) units is an oligomer.

The term "monomer" means a molecule that can undergo polymerization thereby contributing constitutional units to the essential structure of a macromolecule such as an oligomer, co-oligomer, polymer, or co-polymer. Examples of monomers include A, C, G, T, adenylate, guanylate, cytidylate, uridylate, amino acids, vinyl chloride, and other vinyls.

The term "polymer" means a substance composed of macromolecules, which is a molecule of high relative molecular mass, the structure of which essentially comprises the multiple repetition of units derived, actually or conceptually, from molecules of low relative molecular mass. In many cases, especially for synthetic polymers, a molecule can be regarded as having a high relative molecular mass if the addition or removal of one or a few of the units has a negligible effect on the molecular properties. This statement fails in the case of certain macromolecules for which the properties may be critically dependent on fine details of the molecular structure. If a part or the whole of the molecule has a high relative molecular mass and essentially comprises the multiple repetition of units derived, actually or conceptually, from molecules of low relative molecular mass, it may be described as either macromolecular or polymeric, or by polymer used adjectivally.

The term "copolymer" means a polymer derived from more than one species of monomer. Copolymers that are obtained by copolymerization of two monomer species are sometimes termed bipolymers, those obtained from three monomers terpolymers, those obtained from four monomers quaterpolymers, etc. The term polymer includes co-polymers.

The term "mer" means one of the chemical units that make up an oligomer, co-oligomer, polymer, or copolymer.

The term "polyethylene glycol" (PEG) means an organic chemical having a chain consisting of the common repeating ethylene glycol unit $[-CH_2-CH_2-O-]_n$. PEG's are typically long chain organic polymers that are flexible, hydrophilic, enzymatically stable, and biologically inert, but they do not have an ionic charge in water. In general, PEG can be divided into two categories. First, there is polymeric PEG having a molecular weight ranging from 1000 to greater than 20,000. Second, there are PEG-like chains having a molecular weight that is less than 1000. Polymeric PEG has been used in bioconjugates, and numerous reviews have described the attachment of this linker moiety to various molecules. PEG has been used as a linker, where the short PEG-like linkers can be classified into two types, the homo-$[X-(CH_2-CH_2-O)_n]-X$ and heterobifunctional $[X-(CH_2-CH_2-O)_n]-Y$ spacers.

The term "PEG derivative" means an ethylene glycol derivative having the common repeating unit of PEG. Examples of PEG derivatives include, but are not limited to, diethylene glycol (DEG), tetraethylene glycol (TEG), polyethylene glycol having primary amino groups, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra(ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa(ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra(ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether.

The term "polyethylene glycol having primary amino groups" refers to polyethylene glycol having substituted primary amino groups in place of the hydroxyl groups. Substitution can be up to 98% in commercial products ranging in molecular weight from 5,000 to 20,000 Da.

The term "alkyl" means a straight or branched chain alkyl group containing up to approximately 20 but preferably up to 8 carbon atoms. Examples of alkyl groups include but are not limited to the following: methyl, ethyl, n-propyl, isopropyl, n-butyl, isobutyl, sec-butyl, tert-butyl, n-pentyl, isopentyl, neopentyl, tert-pentyl, isohexyl, n-hexyl, n-heptyl, and n-octyl. A substituted alkyl has one or more hydrogen atoms substituted by other groups or a carbon replaced by a divalent, trivalent, or tetravalent group or atom. Although alkyls by definition have a single radical, as used herein, alkyl includes groups that have more than one radical to meet valence requirements for substitution.

The term "alkenyl" means a straight or branched chain alkyl group having at least one carbon-carbon double bond, and containing up to approximately 20 but preferably up to 8 carbon atoms. Examples of alkenyl groups include, but are not limited to, vinyl, 1-propenyl, 2-butenyl, 1,3-butadienyl, 2-pentenyl, 2,4-hexadienyl, 4-(ethyl)-1,3-hexadienyl, and 2-(methyl)-3-(propyl)-1,3-butadienyl. A substituted alkenyl has one or more hydrogen atoms substituted by other groups or a carbon replaced by a divalent, trivalent, or tetravalent group or atom. Although alkenyls by definition have a single radical, as used herein, alkenyl includes groups that have more than one radical to meet valence requirements for substitution.

The term "alkynyl" means a straight or branched chain alkyl group having a single radical, having at least one carbon-carbon triple bond, and containing up to approximately 20 but preferably up to 8 carbon atoms. Examples of alkynyl groups include, but are not limited to, the ethynyl, 1-propynyl, 2-propynyl, 1-butynyl, 2-butynyl, 3-butynyl, 4-pentynyl, 5-hexynyl, 6-heptynyl, 7-octynyl, 1-methyl-2-butynyl, 2-methyl-3-pentynyl, 4-ethyl-2-pentynyl, and 5,5-methyl-1,3-hexynyl. A substituted alkynyl has one or more hydrogen atoms substituted by other groups or a carbon replaced by a divalent, trivalent, or tetravalent group or atom. Although alkynyls by definition have a single radical, as used herein, alkynyl includes groups that have more than one radical to meet valence requirements for substitution.

The term "cycloalkyl" means an alkyl group forming at least one ring, wherein the ring has approximately 3 to 14 carbon atoms. Examples of cycloalkyl groups include but are not limited to the following: cyclopropyl, cyclobutyl, cyclopentyl, and cyclohexyl. A substituted cycloalkyl has one or more hydrogen atoms substituted by other groups or a carbon replaced by a divalent, trivalent, or tetravalent group or atom. Although cycloalkyls by definition have a single radical, as used herein, cycloalkyl includes groups that have more than one radical to meet valence requirements for substitution.

The term "cycloalkenyl" means an alkenyl group forming at least one ring and having at least one carbon-carbon double bond within the ring, wherein the ring has approximately 3 to 14 carbon atoms. Examples of cycloalkenyl groups include, but are not limited to, cyclopropenyl, cyclobutenyl, cyclopentenyl, 1,3-cyclopentadienyl, and cyclohexenyl. A substituted cycloalkenyl has one or more hydrogens substituted by other groups or a carbon replaced by a divalent, trivalent, or tetravalent group or atom. Although cycloalkenyls by definition have a single radical, as used herein, cycloalkenyl includes groups that have more than one radical to meet valence requirements for substitution.

The term "cycloalkynyl" means an alkynyl group forming at least one ring and having at least one carbon-carbon triple bond, wherein the ring contains up to approximately 14 carbon atoms. A group forming a ring having at least one triple bond and having at least one double bond is a cycloalkynyl group. An example of a cycloalkynyl group includes, but is not limited to, cyclooctyne. A substituted cycloalkynyl has one or more hydrogen atoms substituted by other groups. Although cycloalkynyls by definition have a single radical, as used herein, cycloalkynyl includes groups that have more than one radical to meet valence requirements for substitution.

The term "aryl" means an aromatic carbon ring group having a single radical and having approximately 4 to 20 carbon atoms. Examples of aryl groups include, but are not limited to, phenyl, naphthyl, and anthryl. A substituted aryl has one or more hydrogen atoms substituted by other groups. Although aryls by definition have a single radical, as used herein, aryl includes groups that have more than one radical to meet valence requirements for substitution. An aryl group can be a part of a fused ring structure such as N-hydroxysuccinimide bonded to phenyl (benzene) to form N-hydroxyphthalimide.

The term "hetero" when used in the context of chemical groups, or "heteroatom" means an atom other than carbon or hydrogen. Preferred examples of heteroatoms include oxygen, nitrogen, phosphorous, sulfur, boron, silicon, and selenium.

The term "heterocyclic ring" means a ring structure having at least one ring moiety having at least one heteroatom forming a part of the ring, wherein the heterocyclic ring has approximately 4 to 20 atoms connected to form the ring structure. An example of a heterocyclic ring having 6 atoms is pyridine with a single herreoatom. Additional examples of heterocyclic ring structures having a single radical include, but are not limited to, acridine, carbazole, chromene, imidazole, furan, indole, quinoline, and phosphinoline. Examples of heterocyclic ring structures include, but are not limited to, aziridine, 1,3-dithiolane, 1,3-diazetidine, and 1,4,2-oxazaphospholidine. Examples of heterocyclic ring structures having a single radical include, but are not limited to, fused aromatic and non-aromatic structures: 2H-furo[3,2-b]pyran, 5H-pyrido[2,3-d]-o-oxazine, 1H-pyrazolo[4,3-d]oxazole, 4H-imidazo[4,5-d]thiazole, selenazolo[5,4-f]benzothiazole, and cyclopenta[b]pyran. Heterocyclic rings can have one or more radicals to meet valence requirements for substitution.

The term "polycyclic" or "polycyclic group" means a carbon ring structure having more than one ring, wherein the polycyclic group has approximately 4 to 20 carbons forming the ring structure and has a single radical. Examples of polycyclic groups include, but are not limited to, bicyclo[1.1.0]butane, bicyclo[5.2.0]nonane, and tricycle[5.3.1.1]dodecane. Polycyclic groups can have one or more radicals to meet valence requirements for substitution.

The term "halo" or "halogen" means fluorine, chlorine, bromine, or iodine.

The term "heteroatom group" means one heteroatom or more than one heteroatoms bound together and having two free valences for forming a covalent bridge between two atoms. For example, the oxy radical, —O— can form a bridge between two methyls to form CH₃—O—CH₃ (dimethyl ether) or can form a bridge between two carbons to form an epoxy such as cis or trans 2,3-epoxybutane,

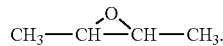

As used herein and in contrast to the normal usage, the term heteroatom group will be used to mean the replacement of groups in an alkyl, alkenyl, alkynyl, cycloalkyl, cycloalkenyl, and cycloalkynyl and not the formation of cyclic bridges, such as an epoxy, unless the term cyclic bridge is used with the term heteroatom group to denote the normal usage.

Examples of heteroatom groups, using the nomenclature for hetero bridges (such as an epoxy bridge), include but are not limited to the following: azimino (—N=N—HN—), azo (—N=N—), biimino (—NH—NH—), epidioxy (—O—O—), epidithio (—S—S—), epithio (—S—), epithioximino (—S—O—NH—), epoxy (—O—), epoxyimino (—O—NH—), epoxynitrilo (—O—N=), epoxythio (—O—S—), epoxythioxy (—O—S—O—), furano (—C₆H₂O—), imino (—NH—), and nitrilo (—N=). Examples of heteroatom groups using the nomenclature for forming acyclic bridges include but are not limited to the following: epoxy (—O—), epithio (—S—), episeleno (—Se—), epidioxy (—O—O—), epidithio (—S—S—), lambda⁴-sulfano (—SH₂—), epoxythio (—O—S—), epoxythioxy (—O—S—O—), epoxyimino (—O—NH—), epimino (—NH—), diazano (—NH—NH—), diazeno (—N=N—), triaz[1]eno (—N=N—NH—), phosphano (—PH—), stannano (—SnH₂—), epoxymethano (—O—CH₂—), epoxyethano (—O—CH₂—CH₂—), epoxyprop[1]eno

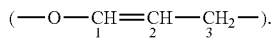

The term "bridge" means a connection between one part of a ring structure to another part of the ring structure by a hydrocarbon bridge. Examples of bridges include but are not limited to the following: methano, ethano, etheno, propano, butano, 2-buteno, and benzeno.

The term "hetero bridge" means a connection between one part of a ring structure to another part of the ring structure by one or more heteroatom groups, or a ring formed by a heterobridge connecting one part of a linear structure to another part of the linear structure, thus forming a ring.

The term "oxy" means the divalent radical —O—.

The term "oxo" means the divalent radical =O.

The term "carbonyl" means the group

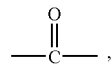

wherein the carbon has two radicals for bonding.

The term "amide" or "acylamino" means the group

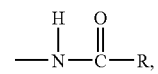

wherein the nitrogen has one single radical for bonding and R is hydrogen or an unsubstituted or substituted alkyl, alkenyl, alkynyl, cycloalkyl, cycloalkenyl, cycloalkynyl, aryl, heterocyclic ring, or polycyclic group.

The term "alkoxy" means the group —O—R, wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of alkoxy groups where the R is an alkyl include but are not limited to the following: methoxy, ethoxy, propoxy, butoxy, pentoxy, hexoxy, heptoxy, octoxy, 1,1-dimethylethoxy, 1,1-dimethylpropoxy, 1,1-dimethylbutoxy, 1,1-dimethylpentoxy, 1-ethyl-1-methylbutoxy, 2,2-dimethylpropoxy, 2,2-dimethylbutoxy, 1-methyl-1-ethylpropoxy, 1,1-diethylpropoxy, 1,1,2-trimethylpropoxy, 1,1,2-trimethylbutoxy, 1,1,2,2-tetramethylpropoxy. Examples of alkoxy groups where the R is an alkenyl group include but are not limited to the following: ethenyloxy, 1-propenyloxy, 2-propenyloxy, 1-butenyloxy, 2-butenyloxy, 3-butenyloxy, 1-methyl-prop-2-enyloxy, 1,1-dimethyl-prop-2-enyloxy, 1,1,2-trimethyl-prop-2-enyloxy, and 1,1-dimethyl-but-2-enyloxy, 2-ethyl-1,3-dimethyl-but-1-enyloxy. Examples of alkyloxy groups where the R is an alkynyl include but are not limited to the following: ethynyloxy, 1-propynyloxy, 2-propynyloxy, 1-butynyloxy, 2-butynyloxy, 3-butynyloxy, 1-methyl-prop-2-ynyloxy, 1,1-dimethyl-prop-2-ynyloxy, and 1,1-dimethyl-but-2-ynyloxy, 3-ethyl-3-methyl-but-1-ynyloxy. Examples of alkoxy groups where the R is an aryl group include but are not limited to the following: phenoxy, 2-naphthyloxy, and 1-anthyloxy.

The term "acyl" means the group

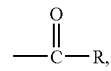

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of acyl groups include but are not limited to the following: acetyl, propionyl, butyryl, isobutyryl, valeryl, isovaleryl, acryloyl, propioloyl, mathacryloyl, crotonoyl, isocrotonoyl, benzoyl, and naphthoyl.

The term "acyloxy" means the group

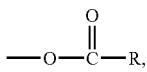

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of acyloxy groups include but are not limited to the following: acetoxy, ethylcarbonyloxy, 2-propenylcarbonyloxy, pentylcarbonyloxy, 1-hexynylcarbonyloxy, benzoyloxy, cyclohexylcarbonyloxy, 2-naphthoyloxy, 3-cyclodecenylcarbonyloxy.

The term "oxycarbonyl" means the group

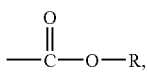

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group. Examples of oxycarbonyl groups include but are not limited to the following: methoxycarbonyl, ethoxycarbonyl, isopropyloxycarbonyl, phenoxycarbonyl, and cyclohexyloxycarbonyl.

The term "acyloxycarbonyl" means the group

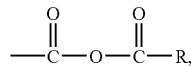

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "alkoxycarbonyloxy" means the group

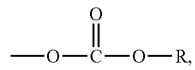

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "carboxy" means the group —C(O)OH, wherein the carbon has a single radical.

The term "imino" or "nitrene" means the group =N—R, wherein the nitrogen has two radicals and R is hydrogen or an unsubstituted or substituted alkyl, alkenyl, alkynyl, cycloalkyl, cycloalkenyl, cycloalkynyl, aryl, heterocyclic ring, or polycyclic group.

The term "amino" means the group —NH2, where the nitrogen has a single radical.

The term "secondary amino" means the group —NH—R, wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "tertiary amino" means the group

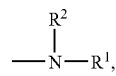

wherein the nitrogen has a single radical and R1 and R2 are independently selected from the group consisting of unsubstituted and substituted alkyl, alkenyl, alkynyl, cycloalkyl, cycloalkenyl, cycloalkynyl, aryl, heterocyclic ring, and polycyclic group.

The term "hydrazi" means the group —NH—NH—, wherein the nitrogens have single radicals bound to the same atom. The term "hydrazo" means the group —NH—NH—, wherein the nitrogens have single radicals bound to the different atoms.

The term "hydrazino" means the group NH2—NH—, wherein the nitrogen has a single radical.

The term "hydrazono" means the group NH2—N=, wherein the nitrogen has two radicals.

The term "hydroxyimino" means the group HO—N=, wherein the nitrogen has two radicals.

The term "alkoxyimino" means the group R—O—N=, wherein the nitrogen has two radicals and R is an unsubstituted or substituted alkyl, alkenyl, alkynyl, cycloalkyl, cycloalkenyl, cycloalkynyl, aryl, heterocyclic ring, or polycyclic group.

The term "azido" means the group N3—, wherein the nitrogen has one radical.

The term "azoxy" means the group —N(O)=N—, wherein the nitrogens have one radical.

The term "alkazoxy" means the group R—N(O)=N—, wherein the nitrogen has one radical and R is hydrogen or an unsubstituted or substituted alkyl, alkenyl, alkynyl, cycloalkyl, cycloalkenyl, cycloalkynyl, aryl, heterocyclic ring, or polycyclic group. Azoxybenzene is an example compound.

The term "cyano" means the group —CN. The term "isocyano" means the group —NC. The term "cyanato" means the group —OCN. The term "isocyanato" means the group —NCO. The term "fulminato" means the group —ONC. The term "thiocyanato" means the group —SCN. The term "isothiocyanato" means the group —NCS. The term "selenocyanato" means the group —SeCN. The term "isoselenocyanato" means the group —NCSe.

The term "carboxyamido" or "acylamino" means the group

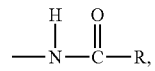

wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "acylimino" means the group

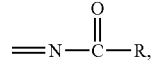

wherein the nitrogen has two radicals and R is hydrogen or an unsubstituted or substituted alkyl, alkenyl, alkynyl, cycloalkyl, cycloalkenyl, cycloalkynyl, aryl, heterocyclic ring, or polycyclic group.

The term "nitroso" means the group O=N—, wherein the nitrogen has a single radical.

The term "aminooxy" means the group —O—NH2, wherein the oxygen has a single radical.

The term "carxoimidioy" means the group

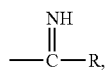

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydrazonoyl" means the group

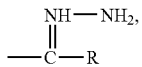

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydroximoyl" or "oxime" means the group

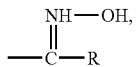

wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "hydrazino" means the group

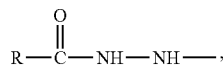

wherein the nitrogen has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "amidino" means the group

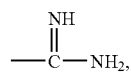

wherein the carbon has a single radical.

The term "sulfide" means the group —S—R, wherein the sulfur has a single radical and R is hydrogen or an unsubstituted or substituted alkyl, alkenyl, alkynyl, cycloalkyl, cycloalkynyl, aryl, heterocyclic ring, or polycyclic group.

The term "thiol" means the group —S—, wherein the sulfur has two radicals. Hydrothiol means —SH.

The term "thioacyl" means the group —C(S)—R, wherein the carbon has a single radical and R is hydrogen or an unsubstituted or substituted alkyl, alkenyl, alkynyl, cycloalkyl, cycloalkenyl, cycloalkynyl, aryl, heterocyclic ring, or polycyclic group.

The term "sulfoxide" means the group

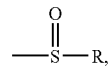

wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfoxide" means the substitution of sulfur for oxygen in sulfoxide; the term includes substitution for an oxygen bound between the sulfur and the R group when the first carbon of the R group has been substituted by an oxy group and when the sulfoxide is bound to a sulfur atom on another group.

The term "sulfone" means the group

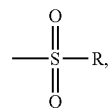

wherein the sulfur has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfone" means substitution of sulfur for oxygen in one or two locations in sulfone; the term includes substitution for an oxyen bound between the sulfur and the R group when the first carbon of the R group has been substituted by an oxy group and when the sulfone is bound to a sulfur atom on another group.

The term "sulfate" means the group

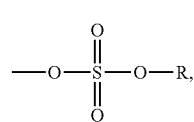

wherein the oxygen has a single radical and R is hydrogen or an unsubstituted or substituted alkyl, alkenyl, alkynyl, cycloalkyl, cycloalkenyl, cycloalkynyl, aryl, heterocyclic ring, or polycyclic group. The term "thiosulfate" means substitution of sulfur for oxygen in one, two, three, or four locations in sulfate.

The term "phosphoric acid ester" means the group $R^1R^2PO_4$—, wherein the oxygen has a single radical and $R^1$ is selected from the group consisting of hydrogen and unsubstituted and substituted alkyl, alkenyl, alkynyl, cycloalkyl, cycloalkenyl, cycloalkynyl, aryl, heterocyclic ring, and polycyclic group, and $R^2$ is selected from the group consisting of unsubstituted and substituted alkyl, alkenyl, alkynyl, cycloalkyl, cycloalkenyl, cycloalkynyl, aryl, heterocyclic ring, and polycyclic group.

The term "substituted" or "substitution," in the context of chemical species, means independently selected from the group consisting of (1) the replacement of a hydrogen on at least one carbon by a monovalent radical, (2) the replacement of two hydrogens on at least one carbon by a divalent radical, (3) the replacement of three hydrogens on at least one terminal carbon (methyl group) by a trivalent radical, (4) the replacement of at least one carbon and the associated hydrogens (e.g., methylene group) by a divalent, trivalent, or tetravalent radical, and (5) combinations thereof. Meeting valence requirements restricts substitution. Substitution occurs on alkyl, alkenyl, alkynyl, cycloalkyl, cycloalkenyl, cycloalkynyl, aryl, heterocyclic ring, and polycyclic groups, providing substituted alkyl, substituted alkenyl, substituted alkynyl, substituted cycloalkyl, substituted cycloalkenyl, substituted cycloalkynyl, substituted aryl group, substituted heterocyclic ring, and substituted polycyclic groups.

The groups that are substituted on an alkyl, alkenyl, alkynyl, cycloalkyl, cycloalkenyl, cycloalkynyl, aryl, heterocyclic ring, and polycyclic groups are independently selected from the group consisting of alkyl, alkenyl, alkynyl, cycloalkyl, cycloalkenyl, cycloalkynyl, aryl, heterocyclic ring, polycyclic group, halo, heteroatom group, oxy, oxo, carbonyl, amide, alkoxy, acyl, acyloxy, oxycarbonyl, acyloxycarbonyl, alkoxycarbonyloxy, carboxy, imino, amino, secondary amino, tertiary amino, hydrazi, hydrazino, hydrazono, hydroxyimino, azido, azoxy, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, thiol, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitrilo, nitro, aci-nitro, nitroso, semicarbazono, oxamoyl, pentazolyl, seleno, thiooxi, sulfamoyl, sulfenamoyl, sulfeno, sulfinamoyl, sulfino, sulfinyl, sulfo, sulfoamino, sulfonato, sulfonyl, sulfonyldioxy, hydrothiol, tetrazolyl, thiocarbamoyl, thiocarbazono, thiocarbodiazono, thiocarbonohydrazido, thiocarbonyl, thiocarboxy, thiocyanato, thioformyl, thioacyl, thiosemicarbazido, thiosulfino, thiosulfo, thioureido, thioxo, triazano, triazeno, triazinyl, trithio, trithiosulfo, sulfinimidic acid, sulfonimidic acid, sulfinohydrazonic acid, sulfonohydrazonic acid, sulfinohydroximic acid, sulfonohydroximic acid, and phosphoric acid ester, and combinations thereof.

As an example of a substitution, replacement of one hydrogen atom on ethane by a hydroxyl provides ethanol, and replacement of two hydogens by an oxo on the middle carbon of propane provides acetone (dimethyl ketone.) As a further example, replacement the middle carbon (the methenyl group) of propane by the oxy radical (—O—) provides dimethyl ether ($CH_3$—O—$CH_3$.) As a futher example, replacement of one hydrogen atom on benzene by a phenyl group provides biphenyl.

As provided above, heteroatom groups can be substituted inside an alkyl, alkenyl, or alkylnyl group for a methylene group (:$CH_2$) thus forming a linear or branched substituted structure rather than a ring or can be substituted for a methylene inside of a cycloalkyl, cycloalkenyl, or cycloalkynyl ring thus forming a heterocyclic ring. As a further example, nitrilo (—N=) can be substituted on benzene for one of the carbons and associated hydrogen to provide pyridine, or and oxy radical can be substituted to provide pyran.

The term "unsubstituted" means that no hydrogen or carbon has been replaced on an alkyl, alkenyl, alkynyl, cycloalkyl, cycloalkenyl, cycloalkynyl, or aryl group.

The term "linker" means a molecule having one end attached or capable of attaching to a solid surface and the other end having a reactive group that is attached or capable of attaching to a chemical species of interest such as a small molecule, an oligomer, or a polymer. A linker may already be bound to a solid surface and/or may already have a chemical species of interest bound to its reactive group. A linker may have a protective group attached to its reactive group, where the protective group is chemically or electrochemically removable. A linker may comprise more than one molecule, where the molecules are covalently joined in situ to form the linker having the desired reactive group projecting away from a solid surface.

The term "spacer" means a molecule having one end attached or capable of attaching to the reactive group of a linker or porous reaction layer and the other end having a reactive group that is attached or capable of attaching to a chemical species of interest such as a small molecule, an oligomer, or a polymer. A spacer may already be bound to a linker or a porous reaction layer and/or may already have a chemical species of interest bound to its reactive group. A spacer may have a protective group attached to its reactive group, where the protective group is chemically or electrochemically removable. A spacer may be formed in situ on a linker or porous reaction layer. A spacer may be formed and then attached to a linker already attached to a solid surface or attached to a porous reaction layer on the solid surface. A spacer may be externally synthesized on a chemical species of interest followed by attachment to a linker already attached to a solid surface or attached to a porous reaction layer on the solid surface. A chemical species of interest may be attached to a spacer that is attached to a linker where the entire structure is then attached to a solid surface at a reactive sight on the solid surface. The purpose of a spacer is to extend the distance between a molecule of interest and a solid surface.

The term "combination linker and spacer" means a linker having both the properties of a linker and a spacer. A combination linker and spacer may be synthesized in situ or synthesized externally and attached to a solid surface.

The term "coating" means a thin layer of material that is chemically and/or physically bound to a solid surface. A coating may be attached to a solid surface by mechanical interlocking as well as by van der Waals forces (dispersion forces and dipole forces), electron donor-acceptor interactions, metallic coordination/complexation, covalent bonding, or a combination of the aforementioned. A coating can provide a reactive group for direct attachment of a chemical species of interest, attachment of a linker, or attachment of a combination linker and spacer. A coating can be polymerized and/or cross-linked in situ.

The term "porous" as used in porous reactive layer or coating means that there are non-uniformities within the layer or coating to allow molecular species to diffuse into and through the layer or coating.

The term "microarray" refers to, in general, planer surface having specific spots that are usually arranged in a column and row format, wherein each spot can be used for some type of chemical or biochemical analysis, synthesis, or method. The spots on a microarray are typically smaller than 100 micrometers. The term "electrode microarray" refers to a microarray of electrodes, wherein the electrodes are the specific spots on the microarray.

The term "monosaccharide" means one sugar molecule unlinked to any other sugars. Examples of monosaccharides include allose, altrose, arabinose, deoxyribose, erythrose, fructose (D-Levulose), galactose, glucose, gulose, idose, lyxose, mannose, psicose, ribose, ribulose, sedoheptulose, D-sorbitol, sorbose, sylulose, L-rhamnose (6-Deoxy-L-mannose), tagatose, talose, threose, xylulose, and xylose.

The term "disaccharide" means two sugars linked together to form one molecule. Examples of disaccharides include amylose, cellobiose (4-β-D-glucopyranosyl-D-glucopyranose), lactose, maltose (4-O-α-D-glucopyranosyl-D-glucose), melibiose (6-O-α-D-Galactopyranosyl-D-glucose), palatinose (6-O-α-D-Glucopyranosyl-D-fructose), sucrose, and trehalose (a-D-Glucopyranosyl-α-D-glucopyranoside).

The term "trisaccharide" means three sugars linked together to form one molecule. Examples of a trisaccharides include raffinose (6-O-α-D-Galactopyranosyl-D-glucopyranosyl-β-D-fructofuranoside) and melezitose (O-α-D-glucopyranosyl-(1→3)-β-D-fructofuranosyl-α-D-glucopyranoside).

The term "polysaccharide" means more than three sugars linked together to form one molecule, but more accurately means a sugar-based polymer or oligomer. Examples of polysaccharides include inulin, dextran, starches, and cellulose. Dextran is a polymer composed of glucose subunits (mers.)

The term "linker hydroxyl group" means a hydroxyl group on a linker moiety, wherein the hydroxyl group is initially protected by a protecting group such as MMT or DMT. After deprotection, the hydroxyl group becomes reactable. For example, after deprotection, a phosphoramidite may be bonded to the linker hydroxyl group to form a synthetic oligonucleotide.

The present invention provides a microarray device having base cleavable sulfonyl linkers and a process to make the microarray. The microarray device comprises: (a) an array device having a plurality of known locations each having a plurality of reacted hydroxyl groups, wherein the density of the plurality of known locations is greater than approximately 100 per square centimeter; and (b) reacted sulfonyl amidite moieties bonded to the reacted hydroxyl groups to form cleavable linkers attached to the plurality of known locations, wherein the cleavable linkers have a linker hydroxyl group and a base-labile cleaving site, whereby a phosphorous-oxygen bond is between phosphorous of the reacted sulfonyl amidite moieties and oxygen of the reacted hydroxyl groups. The process to make the inventive microarray device comprises: (a) providing a plurality of known locations each having a plurality of hydroxyl groups, wherein the density of the plurality of known locations is greater than approximately 100 per square centimeter; and (b) bonding sulfonyl amidite moieties to the hydroxyl groups to form cleavable linkers attached to the solid surface, wherein the cleavable linkers have a linker hydroxyl group and a base-labile cleaving site, whereby a phosphorous-oxygen bond is formed between phosphorous of the sulfonyl amidite moieties and oxygen of the hydroxyl groups.

In a further embodiment, the present invention provides a microarray having base cleavable sulfonyl linkers with oligomers synthesized in situ onto the linkers and a process to make the microarray. The microarray comprises: (a) a plurality of known locations, each having a plurality of reacted hydroxyl groups, wherein the density of the plurality of known locations is greater than approximately 100 per square centimeter; (b) reacted sulfonyl amidite moieties bonded to the reacted hydroxyl groups to form cleavable linkers attached to the solid surface, wherein the cleavable linkers have a linker hydroxyl group and a base-labile cleaving site, whereby a phosphorous-oxygen bond is between phosphorous of the reacted sulfonyl amidite moieties and oxygen of the reacted hydroxyl groups; and (c) oligomers bonded to the linker hydroxyl groups. The process to make the microarray comprises: (a) providing a solid surface having known locations with hydroxyl groups, wherein the density of the known locations is greater than approximately 100 per square centimeter; (b) bonding sulfonyl amidite moieties to the hydroxyl groups to form cleavable linkers attached to the solid surface, wherein the cleavable linkers have a linker hydroxyl group and a base-labile cleaving site, whereby a phosphorous-oxygen bond is formed between phosphorous of the sulfonyl amidite moieties and oxygen of the hydroxyl groups; and (c) synthesizing oligomers onto the linker hydroxyl groups.

In a further embodiment, the present invention provides a process to cleave oligomers from a microarray having base cleavable sulfonyl linkers with the oligomers synthesized in situ onto the linkers. The process to make the microarray comprises: (a) providing a plurality of known locations each with a plurality of hydroxyl groups, wherein the density of the plurality of known locations is greater than approximately 100 per square centimeter; (b) bonding sulfonyl amidite moieties to the plurality of hydroxyl groups to form cleavable linkers at the plurality of known locations, wherein the cleavable linkers have a linker hydroxyl group and a base-labile cleaving site, whereby a phosphorous-oxygen bond is formed between phosphorous of the sulfonyl amidite moieties and oxygen of the hydroxyl groups; (c) synthesizing oligomers onto the linker hydroxyl groups; and (d) cleaving at the base-labile cleaving site the oligomers from the solid surface using a cleaving base, whereby the oligomers are recoverable. In a further embodiment, the present invention provides a pool of oligomers produced according to the four-step process recited immediately above, wherein the oligomers are oligonucleotides having a three prime phosphate, wherein the pool of oligomers comprises more than approximately 100 different oligonucleotides.

Figure 1B:
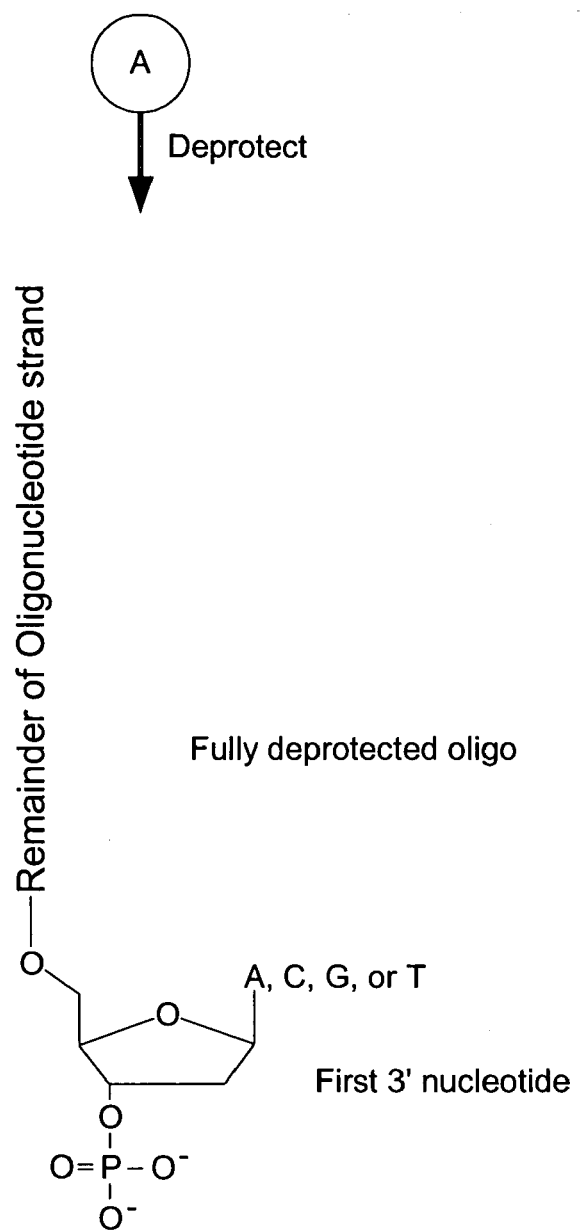
Figure 2:
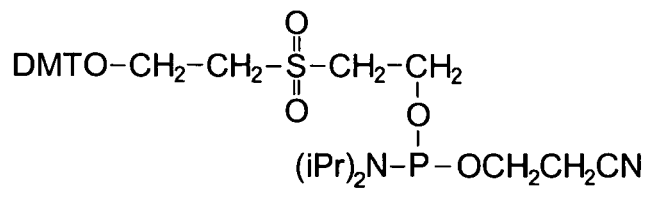
FIG. 2 is a schematic of a sulfonyl amidite used to form a cleavable linker on a microarray.

FIGS. 1A and 1B provide a sequence of drawings that show the process of making the microarrays recited in each of the above embodiments; the figures are not drawn to scale. The figures show a cross-section of only one of the plurality of known locations, preferably located on a solid surface of the microarray. Preferably, the density of the plurality of known locations is greater than 100 per square centimeter and can be approximately 1,000 to approximately 1,000,000 locations per square centimeter or even higher. The first step in FIG. 1A shows the hydroxyl groups before reaction. The hydroxyl groups are preferably accessible for chemical reactions thereto. The second step of FIG. 1A shows the sulfonyl amidite moieties attached to the hydroxyl groups through a phosphorous-oxygen bond between the phosphorous of the sulfonyl amidite moieties and the oxygen of the hydroxyl groups. A sulfonyl amidite moiety is shown in FIG. 2. To attach the sulfonyl amidite moiety, a mixture of activator and the amidite is made and applied to the microarray. Preferably, the activator is tetrazole at a concentration of about 0.45 molar before mixing. More preferably, the activator is 5-ethylthio-1H-tetrazole at a concentration of about 0.25 molar before mixing. Preferably, the activator is in acetonitrile. Preferably, the concentration of the amidite is 100 millimolar before mixing. Preferably, the mixture is a one to one mixture by volume. Preferably, the reaction of the amidite proceeds for about 1 to 30 minutes, and more preferably the reaction proceeds for about 5 minutes. After reaction, the hydroxyl groups are referred to as reacted hydroxyl groups. The phosphorous is oxidized from phosphorous III to V according to standard phosphoramidite synthesis. Preferably, the oxidation is performed using Ox-T solution and the reaction proceeds for about 10 to 60 seconds, and more preferably the reaction proceeds for about 30 seconds. The hydroxyl groups that are not reacted are capped. The protecting group on the oxygen of the sulfonyl amidite moieties is removed using acidic reagent. Preferably, acidic reagent is generated electrochemically while being confined by scavenging agents or buffers, natural diffusion, and the porous reaction layer, which partially physically limits diffusion. The protecting group is preferably dimethoxytrityl (DMT) although, generally, any acid-labile protecting group will work such as those disclosed in Montgomery I, II, or III. The resulting structure forms cleavable linkers attached to the microarray at known locations. The cleaving point is shown in the last step of FIG. 1A. FIG. 1B shows an oligonucleotide cleaved from the microarray and having a three prime phosphate.

FIG. 1A shows the attachment of the oligomers after synthesis onto the deprotected hydroxyl of the sulfonyl amidite moieties. Preferably, the oligomers are selected from the group consisting of DNA, RNA, and polypeptide, and combinations thereof. FIGS. 1A and 1B show the oligomers as oligonucleotides. More preferably, the oligomers are DNA. Preferably, the oligomers are synthesized in situ using electrochemical synthesis. Electrochemical synthesis of DNA or RNA uses standard phosphoramidite synthesis and electrochemical deblocking, which is electrochemical generation of acid for deprotection of each unit of a DNA or RNA strand. Electrochemical deblocking involves turning on an electrode to generate acidic conditions at the electrode sufficient to remove the protecting group only at that electrode. The acidic reagent may be confined as disclosed previously for removing DMT on a sulfonyl amidite and as disclosed in the Montgomery patents. Removal of the protecting group allows addition of the next unit (mer). Optionally, the oligomers are synthesized in situ by a method selected from the group consisting of (a) printing reagents via ink jet or other printing technology and using regular phosphoramidite chemistry, (b) maskless photo-generated acid controlled synthesis and using regular phosphoramidite chemistry, (c) mask-directed parallel synthesis using photo-cleavage of photolabile protecting groups, and (d) maskless parallel synthesis using photo-cleavage of photolabile protecting groups and digital photolithography.

Preferably, the cleaving base is selected from the group consisting of ammonium hydroxide, electrochemically generated base, sodium hydroxide, potassium hydroxide, methylamine, and ethylamine and combinations thereof. More preferably, the cleaving base is concentrated ammonium hydroxide, the reaction temperature is about 65 degrees Celsius, and the reaction time is about four to six hours. During exposure to the cleaving base, cleaving occurs as well as deprotection of oligonucleotides synthesized on the cleavable linker. To recover oligonucleotides cleaved from a microarray, the microarray is preferably place on ice for about 10 minutes, and if ammonium hydroxide is used, a vacuum evaporator is used to remove the ammonium hydroxide from the oligonucleotides. The oligonucleotides may be re-suspended into solution and cleaned to remove impurities.

Preferably, each of the known locations is associated with an electrode to form an electrode array, wherein the electrodes are electronically addressable. An example of an electrode microarray is a CombiMatrix CustomArray™ 12k, which has over 12,000 electrodes and an electrode density of approximately 17,778 electrodes per square centimeter. Preferably, the known locations are on the same surface as the electrodes, on an opposing surface to the electrodes, or on an overlayer over the electrodes.

Optionally, the array comprises a surface that is glass without a silane linking agent or with a silane linking agent. Preferably, the silane linking agent has organic hydroxyl groups that are the hydroxyl groups of the known locations. Preferably, the silane linking agent is a chemical selected from the group consisting of hydroxymethyltriethoxysilane, N-(3-triethoxysilylpropyl)gluconamide, N-(3-triethoxysilylpropyl)-4-hydroxybutyramide, 1-trimethoxysilyl-3-propanol, 1-trimethoxysilyl-2,3-propanediol, 1-triethoxysilyl-3-propanol, 1-trimethoxysilyl-2,3-propanediol, 1-trimethoxysilyl-2-ethanol,triethoxysilyl-2-ethanol, trimethoxysilyl-11-undecanol, and triethoxysilyl-11-undecanol and combinations thereof.

Preferably, the sulfonyl amidite moiety is 2-[2-(4,4'-dimethoxytrityloxy)ethylsulfonyl) ethyl-(2-cyanoethyl)-(N,N-diisopropyl)-phosphoramidite. Optionally, spacers having reactive hydroxyl groups are bound to the hydroxyl groups of the known locations, wherein the sulfonyl amidite moities are bound to the reactive hydroxyl groups of the spacers. Preferably, the spacer is selected from the group consisting of DNA, RNA, polyethylene glycol, and polypeptides, and combinations thereof. Preferably, the spacer is approximately 1 to 35 mers. More preferably, the spacer is a 10-T, although A, C, G, or U may be used in the spacer. The T-spacer is convenient because of a lack of a protecting group on the base. An oligonucleotide space may be synthesized using electrochemical synthesis or one of the other methods suitable for oligonucleotide synthesis on a microarray. Final deprotection of an oligonucleotide linker may be accomplished by using electrochemical generation of acid or by exposure to acidic solution such as Deblock-T solution, which is 3% trichloroacetic acid in dichloromethane.

Preferably, a porous reaction layer attached to the known locations provides the hydroxyl groups, wherein the porous reaction layer comprises a chemical species or mixture of chemical specie, wherein the chemical species is selected from the group consisting of monosaccharides, disaccharides, trisaccharides, polyethylene glycol, polyethylene glycol derivative, N-hydroxysuccinimide, formula I, formula II, formula III, formula IV, formula V, formula VI, formula VII, and combinations thereof, wherein formula I is

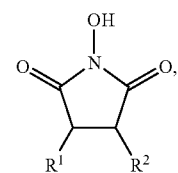

formula II is

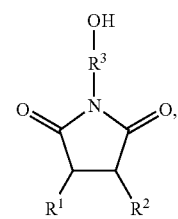

formula III is $HOR^4(OR^5)_mR^9$, formula IV is

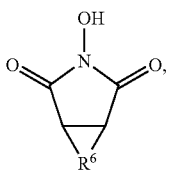

formula V is

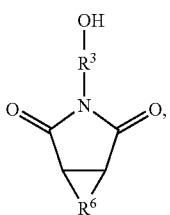

formula VI is

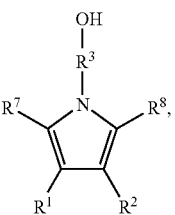

and formula VII is

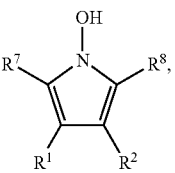

wherein in each formula m is an integer from 1 to 4; $R^1$, $R^2$, $R^7$, and $R^8$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester; $R^3$ is selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group; $R^4$ and $R^5$ are independently selected from the group consisting of methylene, ethylene, propylene, butylene, pentylene, and hexylene; $R^6$ forming a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group; and $R^9$ is selected from the group consisting of amino and hydroxyl.

Preferably, the monosaccharide is selected from the group consisting of allose, altrose, arabinose, deoxyribose, erythrose, fructose, galactose, glucose, gulose, idose, lyxose, mannose, psicose, L-rhamnose, ribose, ribulose, sedoheptulose, D-sorbitol, sorbose, sylulose, tagatose, talose, threose, xylulose, and xylose. Preferably, the disaccharide is selected from the group consisting of amylose, cellobiose, lactose, maltose, melibiose, palatinose, sucrose, and trehalose. Preferably, the triaccharide is selected from the group consisting of raffinose and melezitose.

Preferably, the polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra(ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa(ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra (ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether. Preferably, the polyethylene glycol has a molecular weight of approximately 1,000 to 20,000.

EXAMPLE 1

In this example, a CombiMatrix CustomArray™ 12k microarray was used to synthesize DNA attached to the microarray through a 10-T spacer and a base-cleavable sulfonyl linker. The microarray had approximately 12,000 platinum electrodes on a solid surface having a porous reaction layer. Each electrode was electronically addressable via computer control. The DNA was electrochemically synthesized in situ onto known locations associated with the electrodes on the microarray. The known locations were on and within a porous reaction layer over the electrodes. The porous reaction layer was composed of sucrose. The electrochemical synthesis used phosphoramidite chemistry coupled with electrochemical deblocking of the protecting groups on the synthesized DNA for the addition of each subsequent nucleotide. For bonding of the phosphoramidites, the microarray had reactive hydroxyl groups provided by the sucrose. Electrochemical deblocking involved turning on an electrode to generate acidic conditions at the electrode that were sufficient to remove the protecting group only at the active electrode. Buffer in the solution used for deblocking and natural diffusion prevented deblocking at non-activated electrodes. Removal of the protecting group allowed addition of the next phosphoramidite.

The cleavable linker was at the end of the 10-T linker/spacer. The microarray was prepared by electrochemical synthesis of the 10-T linker on all locations on the microarray. The final trityl on the 10-T linker was removed using electrochemically-generated acid. After synthesis of the linker and removal of the protecting groups on the linker, a solution having sulfonyl amidite was coupled to selected locations. The sulfonyl amidite was 2-[2-(4,4'-dimethoxytrityloxy) ethylsulfonyl)ethyl-(2-cyanoethyl)-(N,N-diisopropyl)-phosphoramidite. The coupling solution comprised a 1:1 mixture of activator solution and 100 mM sulfonyl amidite solution in acetonitrile. The solution was added to a reaction chamber of the microarray immediately after mixing the components. Care was taken to prevent water contamination during the coupling step. The coupling reaction proceeded for 5 minutes. The reaction chamber was evacuated, and an oxidation solution (Ox-T) was injected and allowed to react for 30 seconds to convert phosphorus III to phosphorus V. The reaction chamber was then cleaned thoroughly with acetonitrile.

A pool of DNA was synthesized onto the cleavable linkers. After synthesis, the microarray was placed in a custom chamber and exposed to ammonium hydroxide at 65° C. for 4-6 hours. The chamber was designed to be able to withstand the pressures created by heating the solution up to the temperature. During this step, the oligonucleotides were cleaved from the microarray and deprotected as the same time.

The microarray was placed on ice for about 10 minutes to allow the ammonium hydroxide to cool to prevent the solution from spraying out of the chamber because of the relatively higher pressure inside the chamber. The ammonium hydroxide solution, which contained the target oligonucleotides, was placed in a 65-microliter tube using a pipette. The ammonium hydroxide was removed using a SpeedVac® vacuum system at a temperature of about 65-85° C. until dry, which took about 30 minutes to an hour. The oligonucleotides were in the form of a pellet at the bottom of the tube. The oligonucleotides were resuspended in a Tris buffer solution and then cleaned using a Microspin® G-25 column obtained from Amersham.

EXAMPLE 2

Thirteen microarrays were prepared according to Example 1 but with some exceptions. First, the microarrays had the same oligonucleotide sequence synthesized on each electrode rather than a pool of oligonucleotides. Additionally, six of the microarrays had the sulfonyl cleavable linker, and seven of the microarrays did not have the sulfonyl cleavable linker.

After synthesis of the oligonucleotides on the group of six microarrays having the cleavable linker, each of those microarrays was exposed to a concentrated ammonium hydroxide solution for four hours at 65 degrees Celsius to remove the oligonucleotides. The oligonucleotides from each microarray were recovered and amplified using PCR. The oligonucleotide recovery was quantified using quantitative PCR, which used SYBR I as the fluorescent intercalating dye. The fluorescence intensity (FI) was monitored during PCR and plotted against the number of PCR cycles. The FI for each reaction was normalized to the highest FI value. For each reaction, the FI value at 50% of the maximum FI value was calculated for each microarray, and the corresponding number of PCR cycles was obtained by interpolation. The average number of PCR cycles to reach 50% FI value for the group six microarrays was about 11 cycles.

For the group of seven microarrays without the cleavable linker, each of those microarrays was exposed to different treatments in an attempt to remove the oligonucleotides for comparison to the cleavable linker microarrays. The treatments included 1% hydrogen peroxide, 1% hydrogen peroxide plus 0.2 molar sucrose, 0.1 molar hydrochloric acid, 0.4 molar hydrochloric acid, concentrated ammonium hydroxide, and methylamine. The oligonucleotides from each microarray were recovered and amplified using PCR. The fluorescence intensity (FI) was monitored during PCR and plotted against the number of PCR cycles. The FI was normalized to the highest FI value. The FI value at 50% of the maximum FI value was calculated for each microarray, and the corresponding number of PCR cycles was obtained by interpolation. The range of the number of PCR cycles to reach 50% FI value for the group seven microarrays was from about 27 cycles to about 35 cycles. Quantitative comparison of the recovery of oligonucleotides from microarrays with and without the cleavable linkers using a standard curve made from commercially synthesized oligonucleotides (of identical sequence) revealed that the microarrays having the cleavable linker yielded an increased recovery of approximately six orders of magnitude over any other removal method we used.

EXAMPLE 3

Figure 3:
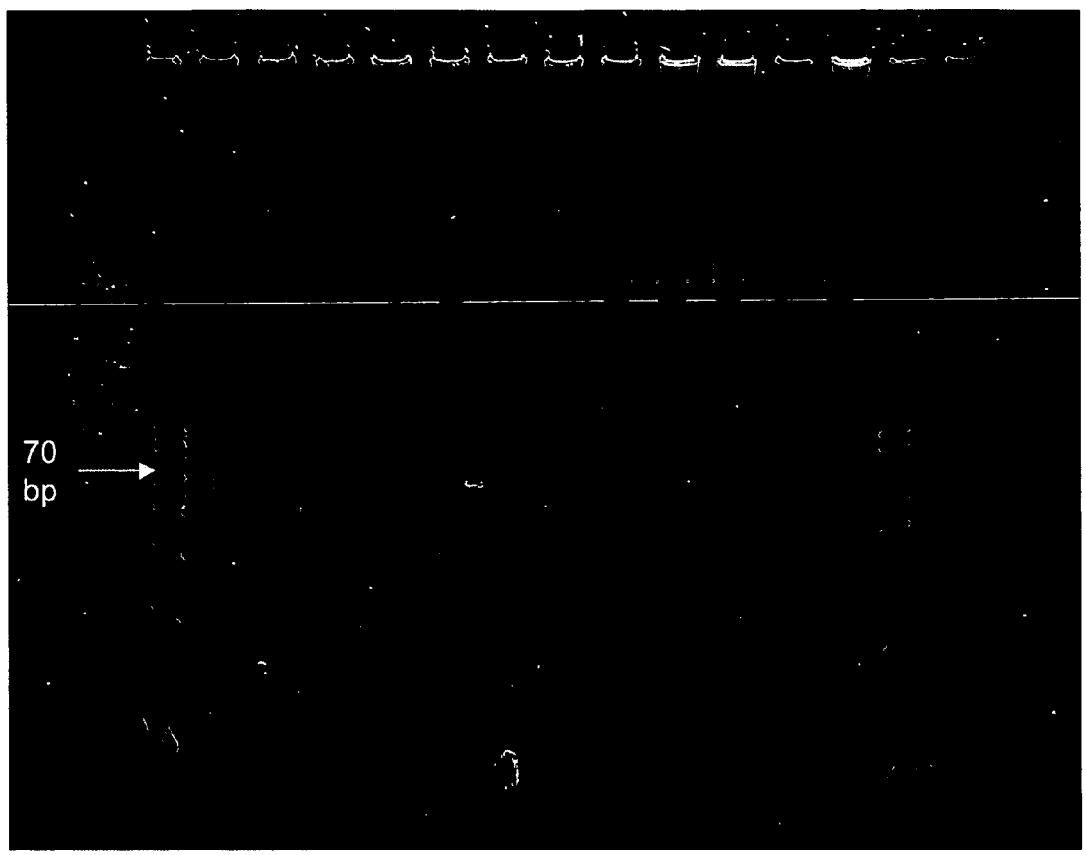
FIG. 3 is an image of a gel from a gel electrophoresis of oligonucleotides recovered from three different microarrays having the cleavable sulfonyl linker.

In this example, three different electrode microarrays were synthesized with each having different oligonucleotides ranging from 66 to 80 base pairs. Each microarray was prepared as in Example 1 except for the different oligonucleotides. After synthesis, the microarrays were exposed to concentrated ammonium hydroxide solution for four hours at 65 degrees Celsius to remove the oligonucleotides. The oligonucleotides from each microarray were recovered. The recovered oligonucleotides were amplified using PCR. The amplified oligonucleotides were subjected to gel electrophoresis. The gel was a 20% polyacrylamide gel. The electrophoresis conditions were 200 volts for 90 minutes. The expected PCR product was 66 to 80 base pairs. FIG. 3 shows an image of the electrophoresis gel. Oligonucleotides 321/322 were from the first microarray. Oligonucleotides 323/324 were from the second microarray. Oligonucleotides 325/326 were from the third microarray. The lanes having a positive sign are those where the oligonucleotides were expected to be located. The lanes having a negative sign are those where the oligonucleotides were not expected to be located. Thus, the olignucleotideos were cleaved from the microarray as expected.

What is claimed is:

1. A process for forming a microarray having base cleavable sulfonyl linkers comprising:
   (a) providing a plurality of known locations each with a plurality of hydroxyl groups, wherein the density of the known locations is greater than approximately 100 per square centimeter; and
   (b) bonding a plurality of sulfonyl amidite moieties to the plurality of hydroxyl groups to form a plurality of cleavable linkers at the plurality of known locations, wherein the cleavable linkers have a linker hydroxyl group and a base-labile cleaving site, whereby a phosphorous-oxygen bond is formed between phosphorous of the sulfonyl amidite moieties and oxygen of the hydroxyl groups.

2. The process of claim 1 further comprising:
   (c) synthesizing a plurality of oligomers onto the linker hydroxyl groups, wherein a protecting group is removed from the linker hydroxyl groups before synthesizing the oligomers.

3. The process of claim 2, wherein the oligomers are selected from the group consisting of DNA, RNA, and polypeptide, and combinations thereof.

4. The process of claim 2, wherein the oligomers are synthesized in situ using electrochemical synthesis.

5. The process of claim 2, wherein the oligomers are synthesized in situ by a method selected from the group consisting of (a) printing reagents via ink jet or other printing technology and using regular phosphoramidite chemistry, (b) maskless photo-generated acid controlled synthesis and using regular phosphoramidite chemistry, (c) mask-directed parallel synthesis using photo-cleavage of photolabile protecting groups, and (d) maskless parallel synthesis using photo-cleavage of photolabile protecting groups and digital photolithography.

6. The process of claim 2 further comprising:
   (d) cleaving at the base-labile cleaving site the oligomers from the solid surface using a cleaving base, whereby the oligomers are recoverable, whereby the oligomers comprising DNA and RNA have a 3' phosphate after cleaving from the solid surface.

7. The process of claim 6, wherein the cleaving base is selected from the group consisting of ammonium hydroxide, electrochemically generated base, sodium hydroxide, potassium hydroxide, methylamine, and ethylamine and combinations thereof.

8. A pool of oligomers produced according to the process of claim 6, wherein the oligomers are oligonucleotides having a 3' phosphate, wherein the pool comprises more than approximately 100 different oligonucleotides.

9. The process of claim 1, wherein the solid surface has electrodes and each of the known locations are associated with one of the electrodes, wherein the electrodes are electronically addressable.

10. The process of claim 1, wherein the sulfonyl amidite moiety is 2-[2-(4,4'-dimethoxytrityloxy)ethylsulfonyl)ethyl-(2-cyanoethyl)-(N,N-diisopropyl)-phosphoramidite.

11. The process of claim 1, wherein spacers having reactive hydroxyl groups are bound to the hydroxyl groups of the known locations, wherein the sulfonyl amidite moieties are bound to the reactive hydroxyl groups of the spacers.

12. The process of claim 11, wherein the spacer is selected from the group consisting of DNA, RNA, polyethylene glycol, and polypeptides, and combinations thereof.

13. The process of claim 11, wherein the spacer is approximately 1 to 35 mers.

14. The process of claim 1, wherein a porous reaction layer attached to the known locations provides the hydroxyl groups, wherein the porous reaction layer comprises a chemical species or mixture of chemical specie, wherein the chemical species is selected from the group consisting of monosaccharides, disaccharides, trisaccharides, polyethylene glycol, polyethylene glycol derivative, N-hydroxysuccinimide, formula I, formula II, formula III, formula IV, formula V, formula VI, formula VII, and combinations thereof, wherein formula I is

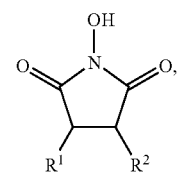

formula II is

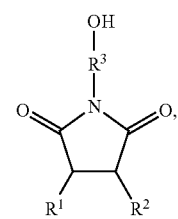

formula III is $HOR^4(OR^5)_mR^9$, formula IV is

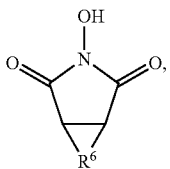

formula V is

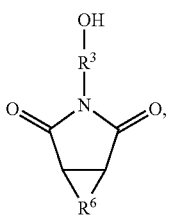

formula VI is

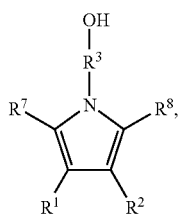

and formula VII is

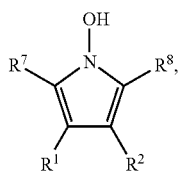

wherein in each formula m is an integer from 1 to 4; $R^1$, $R^2$, $R^7$, and $R^8$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester; $R^3$ is selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group; $R^4$ and $R^5$ are independently selected from the group consisting of methylene, ethylene, propylene, butylene, pentylene, and hexylene; $R^6$ forming a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group; and $R^9$ is selected from the group consisting of amino and hydroxyl.

15. The process of claim 14, wherein the monosaccharide is selected from the group consisting of allose, altrose, arabinose, deoxyribose, erythrose, fructose, galactose, glucose, gulose, idose, lyxose, mannose, psicose, L-rhamnose, ribose, ribulose, sedoheptulose, D-sorbitol, sorbose, sylulose, tagatose, talose, threose, xylulose, and xylose.

16. The process of claim 14, wherein the disaccharide is selected from the group consisting of amylose, cellobiose, lactose, maltose, melibiose, palatinose, sucrose, and trehalose 17. The process of claim 14, wherein the triaccharide is selected from the group consisting of raffinose and melezitose.

18. The process of claim 14, wherein the polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra (ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa (ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra (ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether.

19. The process of claim 14, wherein the polyethylene glycol has a molecular weight of approximately 1,000 to 20,000.

20. A microarray having base cleavable sulfonyl linkers comprising:
(a) a plurality of known locations having a plurality of reacted hydroxyl groups, wherein the density of the known locations is greater than approximately 100 per square centimeter; and
(b) a plurality of reacted sulfonyl amidite moieties bonded to the plurality of reacted hydroxyl groups to form a plurality of cleavable linkers attached to the solid surface, wherein the cleavable linkers have a linker hydroxyl group and a base-labile cleaving site, whereby a phosphorous-oxygen bond is between phosphorous of the reacted sulfonyl amidite moieties and oxygen of the reacted hydroxyl groups.

21. The microarray of claim 20 further comprising:
(c) oligomers bonded to the linker hydroxyl groups.

22. The microarray of claim 21, wherein the oligomers are selected from the group consisting of DNA, RNA, and polypeptide, and combinations thereof.

23. The microarray of claim 21, wherein the oligomers are synthesized in situ using electrochemical synthesis.

24. The microarray of claim 21 wherein the oligomers are synthesized in situ by a method selected from the group consisting of (a) printing reagents via ink jet or other printing technology and using regular phosphoramidite chemistry, (b) maskless photo-generated acid controlled synthesis and using regular phosphoramidite chemistry, (c) mask-directed parallel synthesis using photo-cleavage of photolabile protecting groups, and (d) maskless parallel synthesis using photo-cleavage of photolabile protecting groups and digital photolithography.

25. The microarray of claim 20, wherein the plurality of known locations comprise electrodes, wherein the electrodes are electronically addressable.

26. The microarray of claim 25, wherein the known locations are on a same surface as the electrodes, on an opposing surface to the electrodes, or on an overlayer over the electrodes.

27. The microarray of claim 20, wherein the reacted sulfonyl amidite moiety is 2-[2-(4,4'-dimethoxytrityloxy)ethylsulfonyl)ethyl-(2-cyanoethyl)-(N,N-diisopropyl)-phosphoramidite.

28. The microarray of claim 20, wherein spacers having reactive hydroxyl groups are bound to the reacted hydroxyl groups of the known locations, wherein the sulfonyl amidite moieties are bound to the reactive hydroxyl groups of the spacers.

29. The microarray of claim 28, wherein the spacers are selected from the group consisting of DNA, RNA, polyethylene glycol, and polypeptides, and combinations thereof.

30. The microarray of claim 28, wherein the spacers are from approximately 1 to 35 mers.

31. The microarray of claim 20, wherein a porous reaction layer attached to the known locations provides the reacted hydroxyl groups, wherein the porous reaction layer comprises a chemical species or mixture of chemical specie, wherein the chemical species is selected from the group consisting of monosaccharides, disaccharides, trisaccharides, polyethylene glycol, polyethylene glycol derivative, N-hydroxysuccinimide, formula I, formula II, formula III, formula IV, formula V, formula VI, formula VII, and combinations thereof, wherein formula I is

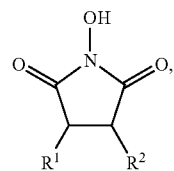

formula II is

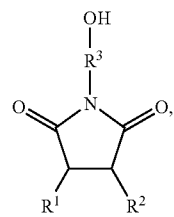

formula III is $HOR^4(OR^5)_mR^9$, formula IV is

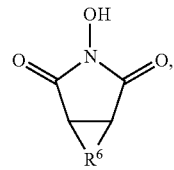

formula V is

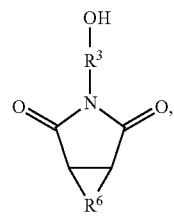

formula VI is

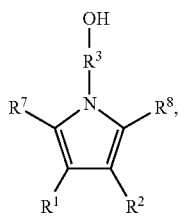

and formula VII is

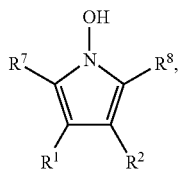

wherein in each formula m is an integer from 1 to 4; $R^1$, $R^2$, $R^7$, and $R^8$ are independently selected from the group consisting of hydrogen, and substituted and unsubstituted alkyl, alkenyl, alkynyl, cycloalkyl, cycloalkenyl, cycloalkynyl, aryl, heterocyclic ring, and polycyclic group, and halo, amide, alkoxy, acyl, acyloxy, oxycarbonyl, acyloxycarbonyl, alkoxycarbonyloxy, carboxy, amino, secondary amino, tertiary amino, hydrazino, azido, alkazoxy, cyano, isocyano, cyanato, isocyanato, thiocyanato, fulminato, isothiocyanato, isoselenocyanato, selenocyanato, carboxyamido, acylimino, nitroso, aminooxy, carboximidoyl, hydrazonoyl, oxime, acylhydrazino, amidino, sulfide, sulfoxide, thiosulfoxide, sulfone, thiosulfone, sulfate, thiosulfate, hydroxyl, formyl, hydroxyperoxy, hydroperoxy, peroxy acid, carbamoyl, trimethyl silyl, nitro, nitroso, oxamoyl, pentazolyl, sulfamoyl, sulfenamoyl, sulfeno, sulfinamoyl, sulfino, sulfo, sulfoamino, hydrothiol, tetrazolyl, thiocarbamoyl, thiocarbazono, thiocarbodiazono, thiocarbonohydrazido, thiocarboxy, thioformyl, thioacyl, thiocyanato, thiosemicarbazido, thiosulfino, thiosulfo, thioureido, triazano, triazeno, triazinyl, trithiosulfo, sulfinimidic acid, sulfonimidic acid, sulfinohydrazonic acid, sulfonohydrazonic acid, sulfinohydroximic acid, sulfonohydroximic acid, and phosphoric acid ester; $R^3$ is selected from the group consisting of heteroatom group, carbonyl, and substituted and unsubstituted alkyl, alkenyl, alkynyl, cycloalkyl, cycloalkenyl, cycloalkynyl, aryl, heterocyclic ring, and polycyclic group; $R^4$ and $R^5$ are independently selected from the group consisting of methylene, ethylene, propylene, butylene, pentylene, and hexylene; $R^6$ forming a ring structure with two carbons of succinimide and is selected from the group consisting of substituted and unsubstituted alkyl, alkenyl, alkynyl, cycloalkyl, cycloalkenyl, cycloalkynyl, aryl, heterocyclic ring, and polycyclic group; and $R^9$ is selected from the group consisting of amino and hydroxyl.

32. The microarray of claim 31, wherein the monosaccharide is selected from the group consisting of allose, altrose, arabinose, deoxyribose, erythrose, fructose, gal actose, glucose, gulose, idose, lyxose, mannose, psicose, L-rhamnose, ribose, ribulose, sedoheptulose, D-sorbitol, sorbose, sylulose, tagatose, talose, threose, xylulose, and xylose.

33. The microarray of claim 31, wherein the disaccharide is selected from the group consisting of amylose, cellobiose, lactose, maltose, melibiose, palatinose, sucrose, and trehalose 34. The microarray of claim 31, wherein the triaccharide is selected from the group consisting of raffinose and melezitose.

35. The microarray of claim 31, wherein the polyethylene glycol derivative is selected from the group consisting of diethylene glycol, tetraethylene glycol, polyethylene glycol having primary amino groups, 2-(2-aminoethoxy) ethanol, ethanol amine, di(ethylene glycol) mono allyl ether, di(ethylene glycol) mono tosylate, tri(ethylene glycol) mono allyl ether, tri(ethylene glycol) mono tosylate, tri(ethylene glycol) mono benzyl ether, tri(ethylene glycol) mono trityl ether, tri(ethylene glycol) mono chloro mono methyl ether, tri(ethylene glycol) mono tosyl mono allyl ether, tri(ethylene glycol) mono allyl mono methyl ether, tetra(ethlyne glycol) mono allyl ether, tetra(ethylene glycol) mono methyl ether, tetra(ethylene glycol) mono tosyl mono allyl ether, tetra(ethylene glycol) mono tosylate, tetra(ethylene glycol) mono benzyl ether, tetra(ethylene glycol) mono trityl ether, tetra (ethylene glycol) mono 1-hexenyl ether, tetra(ethylene glycol) mono 1-heptenyl ether, tetra(ethylene glycol) mono 1-octenyl ether, tetra(ethylene glycol) mono 1-decenyl ether, tetra(ethylene glycol) mono 1-undecenyl ether, penta(ethylene glycol) mono methyl ether, penta(ethylene glycol) mono allyl mono methyl ether, penta(ethylene glycol) mono tosyl mono methyl ether, penta(ethylene glycol) mono tosyl mono allyl ether, hexa(ethylene glycol) mono allyl ether, hexa(ethylene glycol) mono methyl ether, hexa(ethylene glycol) mono benzyl ether, hexa(ethylene glycol) mono trityl ether, hexa(ethylene glycol) mono 1-hexenyl ether, hexa(ethylene glycol) mono 1-heptenyl ether, hexa(ethylene glycol) mono 1-octenyl ether, hexa(ethylene glycol) mono 1-decenyl ether, hexa(ethylene glycol) mono 1-undecenyl ether, hexa(ethylene glycol) mono 4-benzophenonyl mono 1-undecenyl ether, hepta(ethylene glycol) mono allyl ether, hepta(ethylene glycol) mono methyl ether, hepta(ethylene glycol) mono tosyl mono methyl ether, hepta(ethylene glycol) monoallyl mono methyl ether, octa(ethylene glycol) mono allyl ether, octa (ethylene glycol) mono tosylate, octa(ethylene glycol) mono tosyl mono allyl ether, undeca(ethylene glycol) mono methyl ether, undeca(ethylene glycol) mono allyl mono methyl ether, undeca(ethylene glycol) mono tosyl mono methyl ether, undeca(ethylene glycol) mono allyl ether, octadeca(ethylene glycol) mono allyl ether, octa(ethylene glycol), deca(ethylene glycol), dodeca(ethylene glycol), tetradeca(ethylene glycol), hexadeca(ethylene glycol), octadeca(ethylene glycol), benzophenone-4-hexa(ethylene glycol) allyl ether, benzophenone-4-hexa(ethylene glycol) hexenyl ether, benzophenone-4-hexa(ethylene glycol) octenyl ether, benzophenone-4-hexa(ethylene glycol) decenyl ether, benzophenone-4-hexa(ethylene glycol) undecenyl ether, 4-flourobenzophenone-4'-hexa(ethylene glycol) allyl ether, 4-flourobenzophenone-4'-hexa(ethylene glycol) undecenyl ether, 4-hydroxybenzophenone-4'-hexa(ethylene glycol) allyl ether, 4-hydroxybenzophenone-4'-hexa(ethylene glycol) undecenyl ether, 4-hydroxybenzophenone-4'-tetra(ethylene glycol) allyl ether, 4-hydroxybenzophenone-4'-tetra (ethylene glycol) undecenyl ether, 4-morpholinobenzophenone-4'-hexa(ethylene glycol) allyl ether, 4-morpholinobenzophenone-4'-hexa(ethylene glycol) undecenyl ether, 4-morpholinobenzophenone-4'-tetra(ethylene glycol) allyl ether, and 4-morpholinobenzophenone-4'-tetra(ethylene glycol) undecenyl ether.

36. The microarray of claim 31, wherein the polyethylene glycol has a molecular weight of approximately 1,000 to 20,000.

* * * * *